July 4, 1933.  J. B. GUENSER  1,916,790
POULTRY APPLIANCE
Filed July 15, 1932   3 Sheets-Sheet 1
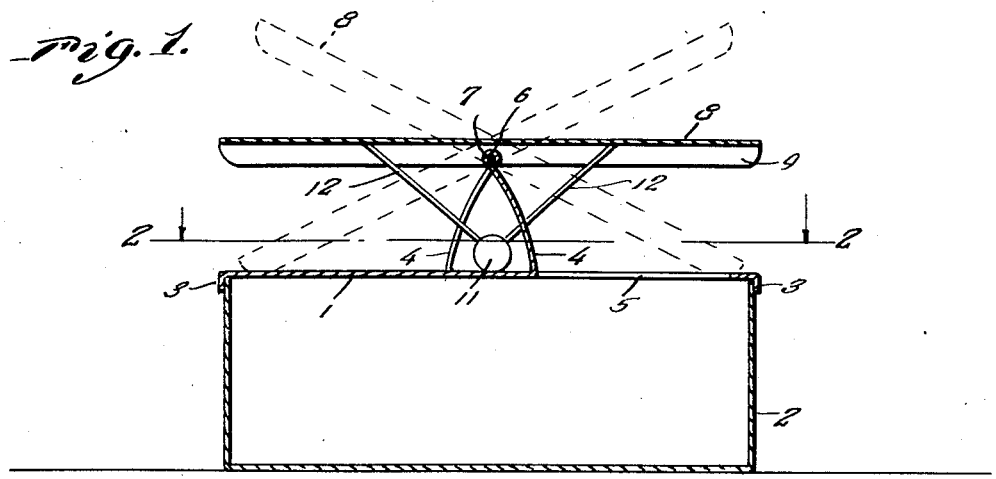
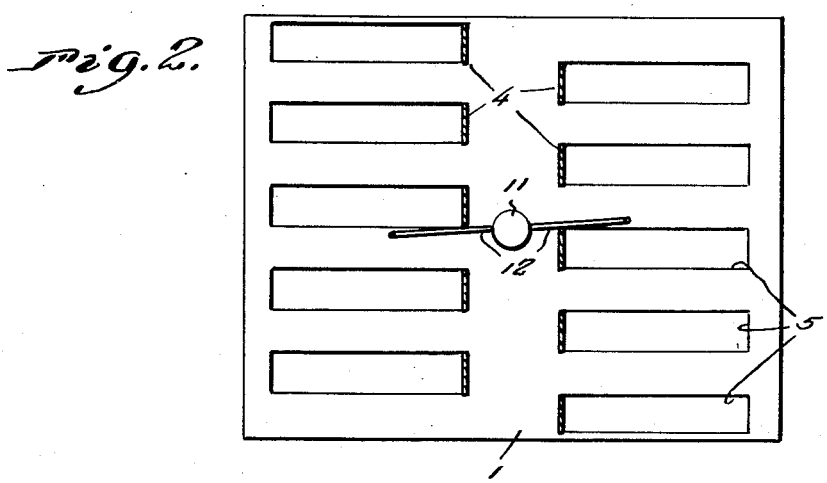
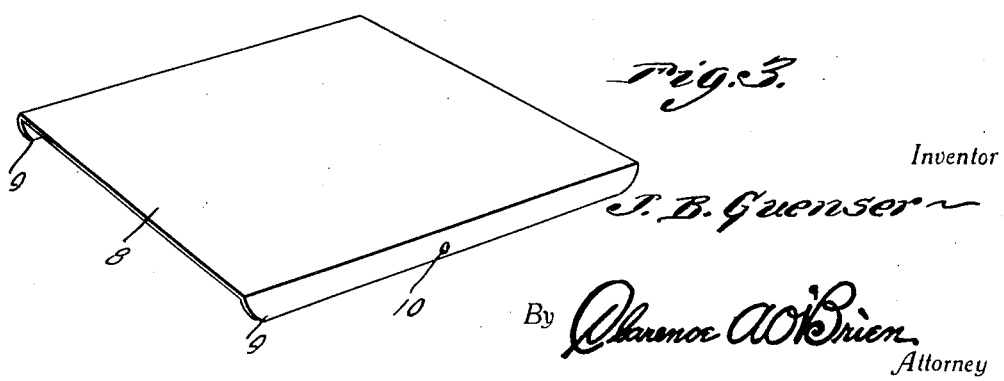
Inventor
J. B. Guenser
By Clarence A. O'Brien
Attorney July 4, 1933.   J. B. GUENSER   1,916,790
POULTRY APPLIANCE
Filed July 15, 1932   3 Sheets-Sheet 2
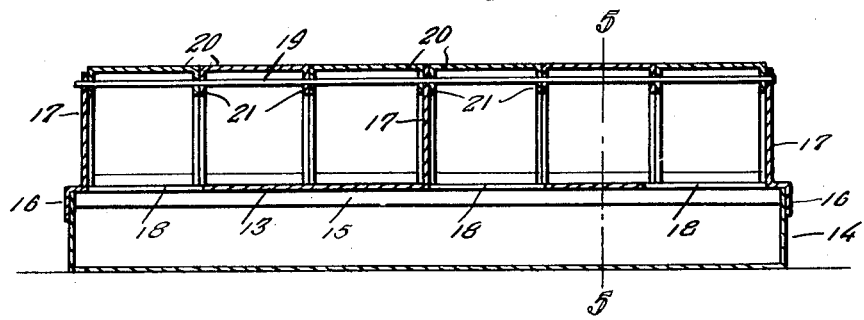
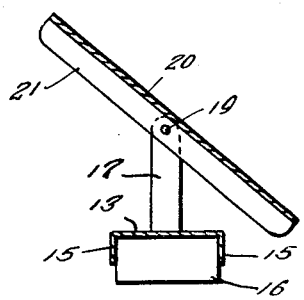
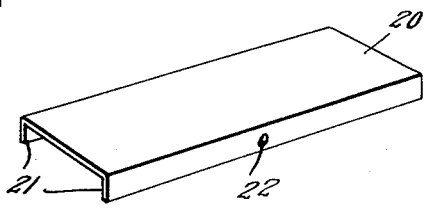
Inventor
J. B. Guenser
By Clarence A. O'Brien
Attorney July 4, 1933. J. B. GUENSER 1,916,790
POULTRY APPLIANCE
Filed July 15, 1932 3 Sheets-Sheet 3
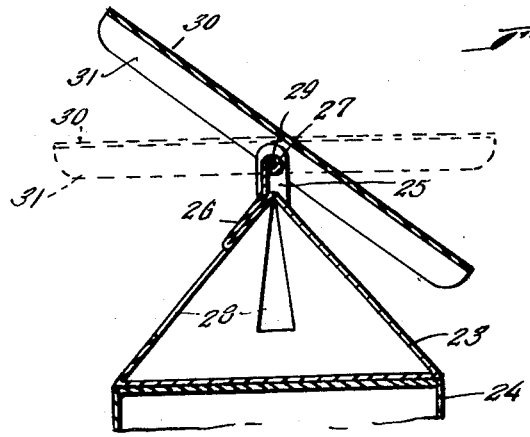
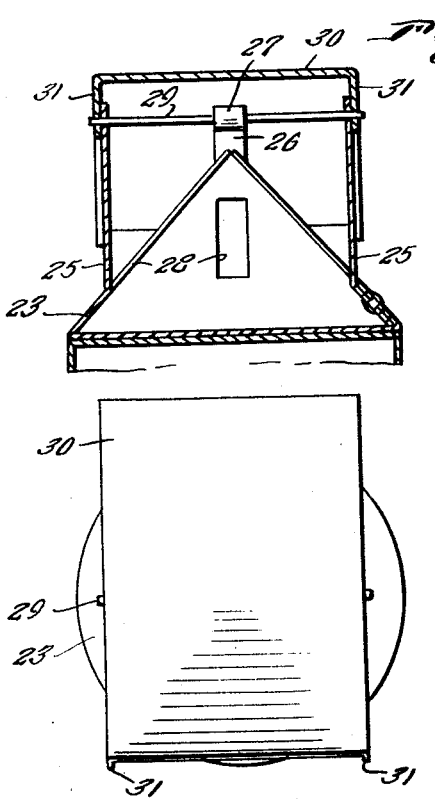
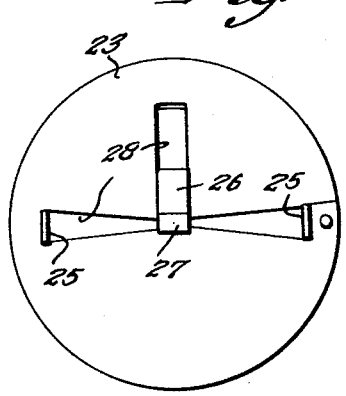
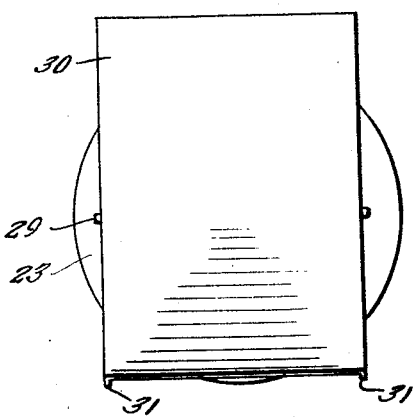
Inventor
J. B. Guenser
By Clarence A. O'Brien
Attorney Patented July 4, 1933

1,916,790

UNITED STATES PATENT OFFICE

JOHN B. GUENSER, OF CHASKA, MINNESOTA

POULTRY APPLIANCE

Application filed July 15, 1932. Serial No. 622,765.

The present invention relates to a poultry appliance and has for its primary object to provide, in a manner as hereinafter set forth, a device of this character embodying the novel construction, combination and arrangement of parts through the medium of which poultry will be prevented from roosting on water fountains and feed troughs.

Other objects of the invention are to provide a poultry appliance of the aforementioned character which will be simple in construction, strong, durable, efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views and wherein:

Figure 1 is a view in vertical transverse section through an embodiment of the present invention.

Figure 2 is a view in horizontal section, taken substantially on the line 2—2 of Figure 1.

Figure 3 is a detail view in perspective of the tiltable guard used in Figures 1 and 2.

Figure 4 is a view in vertical longitudinal section through another form of the invention.

Figure 5 is a view in vertical transverse section, taken substantially on the line 5—5 of Fig. 4.

Figure 6 is a view in perspective of the device shown in Figure 4 removed from the trough and with the tiltable rods removed.

Figure 7 is a detail view in perspective of one of the tiltable guards used in the form of the invention shown in Figure 4.

Figure 8 is a view in vertical section through another form of the invention.

Figure 9 is a view in vertical section taken at right angles to Figure 8.

Figure 10 is a view in top plan of the device shown in Figures 8 and 9 with the tiltable guard removed.

Figure 11 is a top plan view of the device shown in Figures 8 to 10 inclusive.

Referring now to Figures 1 to 3 inclusive, of the drawings, it will be seen that the appliance comprises a metallic plate 1 which is adapted to fit on top of the fountain, trough, or tank 2 in a manner to provide a top therefor, said plate having the downturned marginal flanges 3 engaged with the sides of the container 2. Arms 4 are struck up from the plate 1 in a manner to provide the series of staggered openings 5 through which access to the contents of the container 2 is had by the poultry.

The free end portions of the arms 4 are formed to provide the aligned eyes 6 through which a rod 7 passes. As is clearly seen in Figure 1 of the drawings, the arms 4 of the two series are bent toward each other to aline the eyes 6.

Pivotally mounted on the rod 7 is a tiltable guard 8 having downturned side flanges 9 provided with the openings 10 which accommodates said rod 7.

A suspended balance weight 11 is mounted on the guard plate 8 through the medium of the upwardly diverging arms 12. The arms 12 are secured, at one end, to the lower side of the guard 8 in any suitable manner, and by soldering or welding, and at their other ends to the weight 11.

In use, should the poultry alight on the guard 8, said guard will be caused to swing by the weight of the poultry from the position shown in full lines in Figure 1 of the drawings to either of the positions indicated in broken lines in said Figure 1, thus causing the poultry to slide off. The guard 8 is then returned to a substantially horizontal position by the gravity actuated weights 11.

In the form of the invention illustrated in Figures 4 to 7 inclusive of the drawings, the reference numeral 13 designates a metallic plate which is adapted to be mounted on top of an elongated container 14 in the form of a fountain, tank or trough. The plate 13 is provided with depending longitudinal side flanges 15 and is further provided with the depending end flanges 16, the latter being engaged with the ends of the container 14 when the device is in operative position.

An aligned series of arms 17 are struck up from the plate 13, providing the openings 18 in said plate. The upper end portions of the arms 17 are provided with aligned openings in which a rod 19 is mounted. Pivotally mounted on the rods 19 is a series of tiltable guards 20. Each guard 20 is provided with the downturned side flanges 21 having aligned openings 22 therein to accommodate the rod 19.

When poultry alight on one or more of the guards 20, said guards will be rocked by gravity to an inclined position, as seen in Figure 5 of the drawings, thus causing the poultry to slide off. Should it be found at all necessary or desirable, balance weights may be suspended beneath the guards 20 for returning said guards to a horizontal position but it is thought that such weights will not be needed in this form of the invention.

In the form of the invention illustrated in Figures 8 to 11, inclusive, of the drawings, the reference numeral 23 designates a substantially conical metallic plate which is adapted to be mounted on top of a container 24 in the form of a tank or water fountain.

Struck up from opposite side portions of the plate 23 are arms 25 having alined openings in their upper end portions. Another arm 26 is struck up from the plate 23 and has its free end portion formed to provide an eye 27. The arm 26 is bent to aline the eye 27 with the openings in the arms 25. By striking the arms 25 and 26 out of the conical plate 23 openings 28 are provided in said plate.

A horizontal rod 29 is mounted in the eye 27 and the openings in the arms 25. Mounted for swinging movement on the rod 29 is a tiltable guard 30 having downturned side flanges 31 provided with openings which accommodate the end portions of said rod 29.

In use, the modification shown in Figures 8 to 11, inclusive, of the drawings is positioned on top of a water fountain or tank. The poultry alights on the guard 30, said guard will be swung by the weight of the poultry from the position indicated in broken lines in Figure 8 of the drawings to the position shown in full lines, or to an oppositely inclined position, thus causing the poultry to slide off.

It is believed that the many advantages of an appliance in accordance with the present invention will be readily understood, and although the preferred embodiments of the invention are as illustrated and described, it is to be understood that further changes, in the details of construction, and in the combination and arrangement of parts may be resorted to which will fall within the scope of the invention as claimed.

Having thus described my invention, what I claim as new is:

1. A poultry appliance comprising a plate, arms struck up from the plate providing openings in said plate, and a tiltable guard having means connected to and supported for swinging movement on the arms.

2. A poultry appliance comprising a plate, arms struck up from the plate providing openings in said plate, a rod mounted on the arms, and a tiltable guard mounted for swinging movement on the rod.

3. A poultry appliance comprising a plate, means for holding the plate in position on a container, arms struck up from the plate providing openings in said plate, and a tiltable guard connected to and supported for swinging movement on the arms above the plate.

4. A poultry appliance comprising a metallic plate, integral arms struck up from the plate providing openings in said plate, means on the plate engageable with a container for holding the plate in position on said container, a rod mounted horizontally on the arms, and a tiltable guard mounted for swinging movement in a vertical plane on the rod.

5. A poultry appliance comprising a plate, arms struck up from the plate providing openings in said plate, a rod mounted on the arms, and a tiltable plate mounted for swinging movement on the rod, said guard including a plate having downturned side flanges, said side flanges having openings therein through which the rod passes.

6. A poultry appliance comprising a plate, series of relatively staggered arms struck up from the plate providing openings in said plate, a rod mounted on the free end portions of the arms, and a tiltable guard mounted for swinging movement on the rod.

7. A poultry appliance comprising a plate, series of relatively staggered arms struck up from the plate providing openings in said plate, a rod mounted on the free end portions of the arms, a tiltable guard mounted for swinging movement on the rod, said plate being adapted for mounting on a container, and means on the plate engageable with the container for retaining the plate in position thereon.

8. A poultry appliance comprising a plate, series of relatively staggered arms struck up from the plate providing openings in said plate, a rod mounted on the free end portions of the arms, a tiltable guard mounted for swinging movement on the rod, said plate being adapted for mounting on a container, means on the plate engageable with the container for retaining the plate in position thereon, and a balance weight connected to and suspended from and beneath the guard for normally maintaining said guard in a substantially horizontal position.

9. A poultry appliance comprising a plate, arms struck up from the plate having aligned openings therein, a rod mounted in the openings in the arms, and a series of tiltable guards pivotally mounted for swinging movement in a vertical plane on the rods.

10. A poultry appliance comprising a plate, arms struck up from the plate having aligned openings therein, a rod mounted in the openings in the arms, a series of tiltable guards pivotally mounted for swinging movement in a vertical plane on the rod, the plate being adapted to be supported on a container, and means on the plate for retaining same in position on the container.

11. A poultry appliance comprising a plate, arms struck up from the plate having aligned openings therein, a rod mounted in the openings in the arms, a series of tiltable guards pivotally mounted for swinging movement in a vertical plane on the rod, the plate being adapted to be supported on a container, and means on the plate for retaining same in position on the container, each guard comprising a plate including downturned side flanges having apertures therein for the passage of the rod.

12. A poultry appliance comprising a substantially conical plate, arms struck up from the plate, a rod mounted horizontally on the free end portions of the arms and a tiltable guard mounted for swinging movement on the rod.

13. A poultry appliance comprising a substantially conical plate, arms struck up from the plate, a rod mounted horizontally on the free end portions of the arms and a tiltable guard mounted for swinging movement on the rod, said guard including a plate provided with downturned side flanges having apertures therein for the reception of the rod.

In testimony whereof I affix my signature.

JOHN B. GUENSER.